(12) United States Patent
Pal et al.

(10) Patent No.: US 10,915,157 B2
(45) Date of Patent: Feb. 9, 2021

(54) DYNAMIC POWER SWITCH CONTROL SCHEME

(71) Applicant: QUALCOMM Incorporated, San Diego, CA (US)

(72) Inventors: Dipti Ranjan Pal, Irvine, CA (US); Jeffrey Gemar, San Diego, CA (US); Abinash Roy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 16/276,532

(22) Filed: Feb. 14, 2019

(65) Prior Publication Data

US 2020/0264682 A1 Aug. 20, 2020

(51) Int. Cl.
*G06F 1/00* (2006.01)
*G06F 1/324* (2019.01)
*G06F 1/08* (2006.01)
*G06F 1/3237* (2019.01)
*G06F 1/3203* (2019.01)

(52) U.S. Cl.
CPC .............. *G06F 1/324* (2013.01); *G06F 1/08* (2013.01); *G06F 1/3237* (2013.01); *G06F 1/3203* (2013.01)

(58) Field of Classification Search
CPC ........... G06F 1/324; G06F 1/08; G06F 1/3237

USPC ......................................................... 713/300
See application file for complete search history.

(56) References Cited

U.S. PATENT DOCUMENTS

| | | | |
|---|---|---|---|
| 8,327,163 B2 | 12/2012 | Chen et al. | |
| 9,337,825 B2 | 5/2016 | Takayanagi et al. | |
| 2009/0201084 A1* | 8/2009 | See | H03F 3/211 330/51 |
| 2010/0219866 A1* | 9/2010 | Chen | G06F 1/26 327/143 |
| 2013/0038361 A1* | 2/2013 | Groot | H03K 19/0013 327/143 |
| 2014/0300407 A1* | 10/2014 | Takayanagi | H03K 19/0016 327/400 |
| 2016/0241240 A1* | 8/2016 | Suzuki | H03K 19/0013 |

* cited by examiner

*Primary Examiner* — Volvick Derose
(74) *Attorney, Agent, or Firm* — Qualcomm Incorporated

(57) ABSTRACT

In certain aspects, an apparatus includes a first power chain, a second power chain, and an enable circuit having an output coupled to an input of the first power chain. The apparatus also includes a multiplexer having a first input coupled to an output of the first power chain, a second input coupled to the output of the enable circuit, and an output coupled to an input of the second power chain, wherein the multiplexer is configured to receive a select signal, and couple the first input or the second input to the output of the multiplexer based on the select signal.

7 Claims, 10 Drawing Sheets

DYNAMIC POWER SWITCH CONTROL SCHEME

BACKGROUND

Field

Aspects of the present disclosure relate generally to power switches, and more particularly, to power switch control.

Background

A system may include circuits and a power delivery network (PDN) that delivers power to the circuits from an external power source. The PDN may include power switches that allow the circuits to be individually power collapsed to conserve power (e.g., reduce power leakage). For example, when a particular circuit is not in use, the circuit may be power collapsed by turning off (i.e., opening) the corresponding power switches to conserve power.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to an apparatus. The apparatus includes a first power chain, a second power chain, and an enable circuit having an output coupled to an input of the first power chain. The apparatus also includes a multiplexer having a first input coupled to an output of the first power chain, a second input coupled to the output of the enable circuit, and an output coupled to an input of the second power chain, wherein the multiplexer is configured to receive a select signal, and couple the first input or the second input to the output of the multiplexer based on the select signal.

A second aspect relates to an apparatus. The apparatus includes a first set of power chains, and a power switch controller. The power switch controller is configured to receive a select signal, sequentially enable the power chains in the first set of power chains if the select signal has a first value, and enable the power chains in the first set of power chains in parallel if the select signal has a second value.

A third aspect relates to a method for power switch control. The method includes receiving a select signal, sequentially enabling power chains in a first set of power chains if the select signal has a first value, and enabling the power chains in the first set of power chains in parallel if the select signal has a second value.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
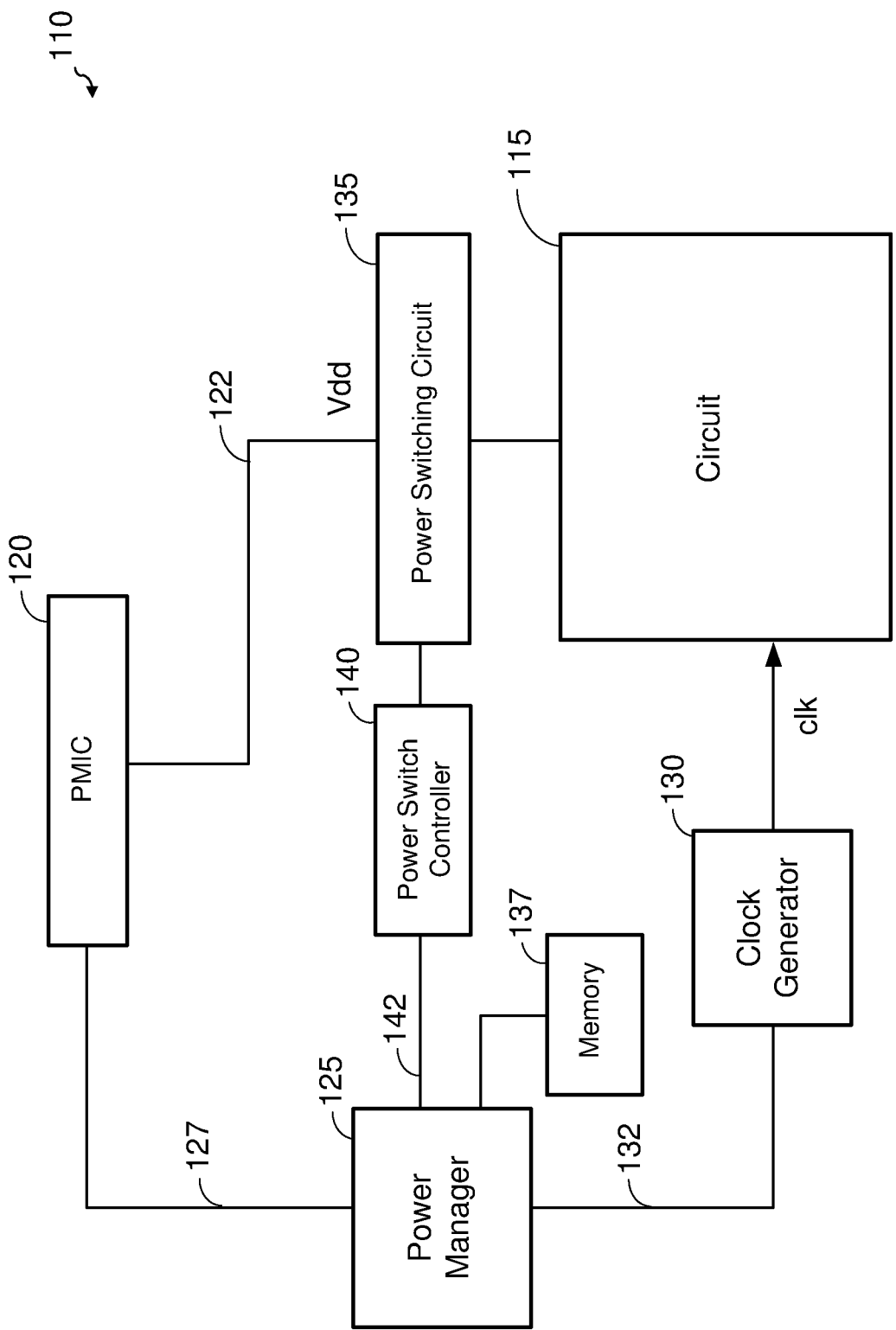
FIG. 1 shows an example of a system including a circuit and a power switching circuit for gating power to the circuit according to certain aspects of the present disclosure.

FIG. 1 shows an example of a system 110 according to certain aspects of the present disclosure. The system 110 includes a circuit 115 (e.g., processor core), a power management integrated circuit (PMIC) 120, a power manager 125, a clock generator 130, a power switching circuit 135, and a power switch controller 140.

The PMIC 120 is configured to generate a supply voltage (labeled "Vdd") for powering the circuit 115. In this regard, the PMIC 120 may include one or more voltage regulators (e.g., switching regulators, linear voltage regulators, etc.) that convert a voltage from an external power source (e.g., a battery) into the supply voltage Vdd. In certain aspects, the voltage level of the supply voltage Vdd is adjustable (i.e., programmable). In these aspects, the PMIC 120 is configured to set the supply voltage Vdd to any one of multiple voltage levels based on a command received via a voltage control line 127, as discussed further below. The PMIC 120 provides the supply voltage Vdd to the circuit 115 via a voltage supply rail 122. In certain aspects, the circuit 115 may share the voltage supply rail 122 with one or more other circuits (not shown).

The clock generator 130 is configured to generate a clock signal (labeled "clk") that is input to the circuit 115 to time operations of the circuit 115 (e.g., processor core). In certain aspects, the frequency of the clock signal clk is adjustable (e.g., programmable). In these aspects, the clock generator 130 is configured to set the frequency of the clock signal clk to any one of multiple clock frequencies based on a command received via a clock control line 132, as discussed further below.

In the example shown in FIG. 1, the power switching circuit 135 is coupled between the voltage supply rail 122 and the circuit 115. The power switching circuit 135 is configured to gate power to the circuit 115, and may include tens to thousands of power switches (not shown in FIG. 1). To power collapse the circuit 115, the power switches in the power switching circuit 135 are turned off (i.e., open), which decouples the circuit 115 from the voltage supply rail 122. The circuit 115 may be power collapsed when the circuit 115 is not in use to conserve power (e.g., reduce power leakage). To power the circuit 115 in an active mode (also referred to as mission mode), the power switches in the power switching circuit 135 are turned on (i.e., closed), which couples the circuit 115 to the voltage supply rail 122.

The power manager 125 is configured to manage power to the circuit 115. In certain aspects, the power manager 125 sets the voltage level of the supply voltage Vdd by sending a command to the PMIC 120 via the voltage control line 127, and sets the frequency of the clock signal clk by sending a command to the clock generator 130 via the clock control line 132, as discussed further below.

In certain aspects, the circuit 115 operates in any one of multiple performance modes (also referred to as performance states), in which each performance mode may provide a different tradeoff between performance and power. Each performance mode has a corresponding supply voltage level and clock frequency. For example, the performance modes may include a high-performance mode (also referred to as "Turbo" mode) having a high supply voltage and a high clock frequency. In this example, the high-performance mode provides high performance (e.g., high-processing speed) at the expense of higher power consumption. The performance modes may also include a low-performance mode (also referred to as low static voltage scaling (SVS) mode) having a low supply voltage and a low clock frequency. In this example, the lower supply voltage reduces dynamic power consumption (which is proportional to the square of the supply voltage) at the expense of lower performance. The performance modes may also include a normal performance mode (also referred to as "Nominal" mode) that provides performance and power consumption between the high-performance mode and the low-performance mode.

In certain aspects, the power manager 125 may set the performance mode of the circuit 115 based on the processing needs of the circuit 115 or the processing needs of a system that includes the circuit 115. For example, if the circuit 115 (e.g., processing core) is performing a task that is computationally intensive and requires low latency, then the power manager 125 may place the circuit 115 in the high-performance mode. If the circuit 115 (e.g., processor core) is performing a task that does not require high performance, then the power manager 125 may place the circuit 115 in the low-performance mode to conserve power.

In certain aspects, the voltage level and clock frequency for each performance mode is stored in a memory 137 coupled to the power manager 125. In this example, the power manager 125 places the circuit 115 in a particular performance mode by retrieving the corresponding voltage level and clock frequency from the memory 137, sending a command to the PMIC 120 via the voltage control line 127 to set the voltage level of the supply voltage Vdd to the retrieved voltage level, and sending a command to the clock generator 130 via the clock control line 132 to set the frequency of the clock signal clk to the retrieved clock frequency.

In certain aspects, the power manager 125 may place the circuit 115 in an inactive mode or an active mode depending on whether the circuit 115 is needed at a given time. For example, the power manager 125 may place the circuit 115 in the inactive mode when the circuit 115 is not needed to conserve power. The power manager 125 places the circuit 115 in the inactive mode by sending a command to the power switch controller 140 via control line 142 to power down the circuit 115. In response, the power switch controller 140 turns off the power switches in the power switching circuit 135, which power collapses the circuit 115.

The power manager 125 may place the circuit 115 in the active mode when the circuit 115 is needed. For example, when the circuit 115 is one of multiple processor cores in a multi-core system, the power manager 125 may power up the circuit 115 if an additional processor core is needed to perform a task. The power manager 125 places the circuit 115 in the active mode by sending a command to the power switch controller 140 via control line 142 to power up (i.e., wake up) the circuit 115. In response, the power switch controller 140 turns on the power switches in the power switching circuit 135 to power up (i.e., wake up) the circuit 115. As discussed further below, the power switches in the power switching circuit 135 may be turned on sequentially to manage inrush current.

FIG. 1 shows an example in which the power switching circuit 135 is coupled between the voltage supply rail 122 and the circuit 115. However, it is to be appreciated that the present disclosure is not limited to this example. For example, the power switching circuit 135 may be coupled between the circuit 115 and ground.

Figure 2:
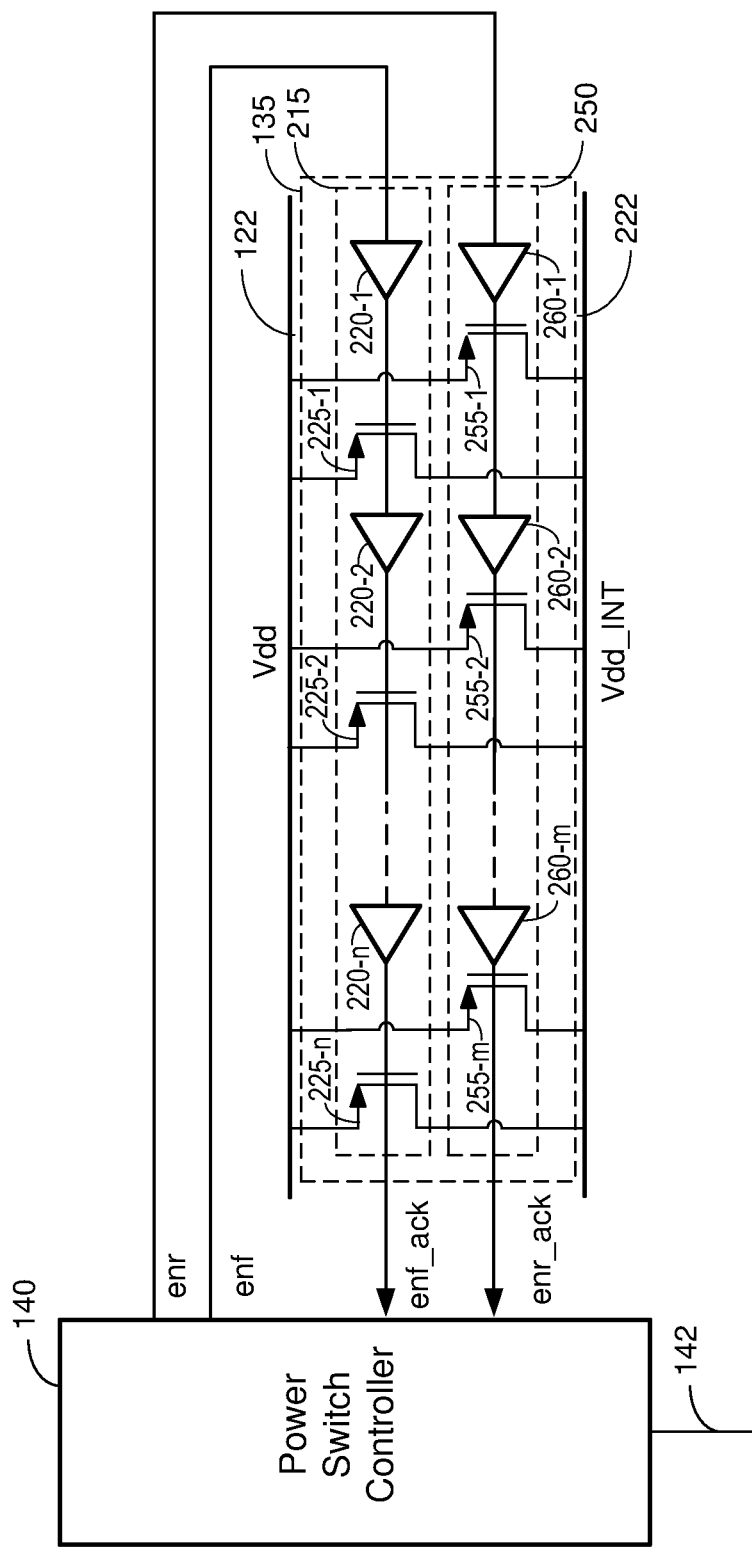
FIG. 2 shows an exemplary implementation of a power switching circuit according to certain aspects of the present disclosure.

FIG. 2 shows an exemplary implementation of the power switching circuit 135 according to certain aspects of the present disclosure. In this example, the power switching circuit 135 includes a first power chain 215 and a second power chain 250. As discussed further below, the first power chain 215 is used to manage inrush current during power up of the circuit 115 (not shown in FIG. 2), and the second power chain 250 is used to provide low resistance between the supply rail 122 and the circuit 115 during the mission mode.

The first power chain 215 includes power switches 225-1 to 225-$n$ and delay elements 220-1 to 220-$n$. The power switches 225-1 to 225-$n$ may number in the tens to thousands. In the example shown in FIG. 2, each of the power switches 225-1 to 225-$n$ is coupled between the voltage supply rail 122 and an internal rail 222 (also referred to as a virtual rail) of the circuit 115. The delay elements 220-1 to 220-$n$ (also referred to as delay buffers) are coupled in series to form a delay line, in which a control input of each of the power switches 225-1 to 225-$n$ is coupled to a respective position on the delay line. As discussed further below, the delay line is used to sequentially turn on the power switches 225-1 to 225-$n$ in the first power chain 215.

The second power chain 250 includes power switches 255-1 to 255-$m$ and delay elements 260-1 to 260-$m$. The power switches 255-1 to 255-$m$ may number in the tens to thousands. The number of power switches 255-1 to 255-$m$ in the second power chain 250 may differ from the number of power switches 225-1 to 225-*n* in the first power chain 215. In the example shown in FIG. 2, each of the power switches 255-1 to 255-*m* is coupled between the voltage supply rail 122 and the internal rail 222 of the circuit 115. The delay elements 260-1 to 260-*m* (also referred to as delay buffers) are coupled in series to form a delay line, in which a control input of each of the power switches 255-1 to 255-*m* is coupled to a respective position on the delay line. As discussed further below, the delay line is used to sequentially turn on the power switches 255-1 to 255-*m* in the second power chain 250.

In certain aspects, the power switches 225-1 to 225-*n* in the first power chain 215 have higher on resistances than the power switches 255-1 to 255-*m* in the second power chain 250. In this disclosure, "on resistance" refers to the resistance of a switch when the switch is turned on. The higher on resistances of the power switches 225-1 to 225-*n* in the first power chain 215 help limit inrush current from the supply rail 122 to the circuit 115 during power up. The lower on resistances of the power switches 255-1 to 255-*m* in the second power chain 250 help keep the IR voltage drop between the supply rail 122 and the internal rail 222 low in the active mode (i.e., the mission mode).

In the example shown in FIG. 2, each of the power switches 225-1 to 225-*n* in the first power chain 215 is implemented with a p-type metal oxide semiconductor (PMOS) power transistor having a source coupled to the supply rail 122, a gate coupled to the delay line in the first power chain 215, and a drain coupled to the internal rail 222. Similarly, each of the power switches 255-1 to 255-*m* in the second power chain 250 is implemented with a PMOS power transistor having a source coupled to the supply rail 122, a gate coupled to the delay line in the second power chain 250, and a drain coupled to the internal rail 222. In this example, the control input of a power switch corresponds to the gate of the respective power transistor. It is to be appreciated that the present disclosure is not limited to the example shown in FIG. 2, and that the power switches may be implemented with other types of power transistors. Further, although FIG. 2 shows an example in which the power switches 225-1 to 225-*n* and 255-1 to 255-*m* are implemented as head switches, it is to be appreciated that the power switches 225-1 to 225-*n* and 255-1 to 255-*m* may instead be implemented as footer switches coupled between the circuit 115 and ground.

When the circuit 115 is in the inactive mode, the power switches 225-1 to 225-*n* and 255-1 to 255-*m* are turned off. To power up (i.e., wake up) the circuit 115 from the inactive mode, the power controller 140 outputs an enable signal (labeled "enf") to the input of the first power chain 215. The enable signal enf then propagates down the delay line formed by the series-coupled delay elements 220-1 to 220-*n*, and turns on the power switches 225-1 to 225-*n* one by one (i.e., sequentially) as the enable signal enf propagates down the delay line. In this example, the enable signal enf turns on a power switch when the enable signal reaches the control input of the power switch coupled to the delay line. The time delays between the turn-on times of the power switches 225-1 to 225-*n* are controlled by the time delays of the delay elements 220-1 to 220-*n*.

The output of the last delay element 220-*n* in the delay line is coupled to the power switch controller 140. In this example, the last delay element 220-*n* outputs the enable signal back to the power controller 140 after the enable signal has propagated through the entire delay line in the first power chain 215, signaling to the power controller 140 that all of the power switches 225-1 to 225-*n* have been turned on. In this example, the enable signal that is output back to the power switch controller 140 is referred to an acknowledgement signal (labeled "enf_ack").

The power switches 225-1 to 225-*n* are turned on sequentially to manage inrush current during power up of the circuit 115. If all of the power switches 225-1 to 225-*n* were turned on at once at the start of power up, then a large inrush current would flow from the supply rail 122 to the circuit 115 to charge up capacitors in the circuit 115 (which may be fully discharged at the start of power up). Sequentially turning on the power switches 225-1 to 225-*n* using the delay elements 220-1 to 220-*n* causes the conductance between the supply rail 122 and the circuit 115 to gradually increase. This limits inrush current during power up and helps ensure a smooth ramp up of the voltage on the internal rail 222 (labeled "Vdd_INT") of the circuit 115.

After receiving the acknowledgement signal enf_ack from the first power chain 215, the power controller 140 outputs an enable signal (labeled "enr") to the input of the second power chain 250. The enable signal enr then propagates down the delay line formed by the series-coupled delay elements 260-1 to 260-*m*, and turns on the power switches 255-1 to 255-*m* one by one (i.e., sequentially) as the enable signal enr propagates down the delay line.

The output of the last delay element 260-*m* in the delay line is coupled to the power switch controller 140. In this example, the last delay element 260-*m* outputs the enable signal back to the power controller 140 after the enable signal has propagated through the entire delay line in the second power chain 250, signaling to the power controller 140 that all of the power switches 255-1 to 255-*m* have been turned on. In this example, the enable signal that is output back to the power switch controller 140 is referred to an acknowledgement signal (labeled "enr_ack").

Thus, to power up the circuit 115, the power switch controller 140 outputs the enable signal enf to the first power chain 215 to initiate sequential turn on of the power switches 225-1 to 225-*n* in the first power chain 215. After receiving the acknowledgement signal enf_ack from the first power chain 215, the power switch controller 140 outputs the enable signal enr to the second power chain 250 to initiate sequential turn on of the power switches 255-1 to 255-*m* in the second power chain 250. In this example, the power up sequence may be expressed as follows: enf→enf_ack→enr→enr_ack.

The high on resistance of the power switches 225-1 to 225-*n* in the first power chain 215 help control inrush current during power up, and the time delays between the power switches 225-1 to 225-*n* provided by the delay elements 220-1 to 220-*n* help ensure smooth ramp up of the voltage Vdd_INT on the internal rail 222. In certain aspects, the first power chain 215 ramps up the internal voltage Vdd_INT to approximately 90 percent of the supply voltage Vdd by the time the acknowledgment signal enf_ack is output.

The low on resistance of the power switches 255-1 to 255-*m* in the second power chain 250 help control inrush current during the active mode (i.e., mission mode), and the time delays between the power switches 255-1 to 255-*m* provided by the delay elements 260-1 to 260-*m* help ensure smooth ramp up of the voltage Vdd_INT on the internal rail 222.

To power down the circuit 115, the power switch controller 140 de-asserts the enable signal enr to the second power chain 250. This causes the power switches 255-1 to 255-*m* in the second power chain 250 to sequentially turn off. The power switch controller 140 may then de-assert the enable signal enf to the first power chain 215 to sequentially turn off the power switches 225-1 to 225-*n* in the first power chain 215.

When the circuit 115 is powered down, it is desirable for the circuit 115 to power down as quickly as possible to save more power. When the circuit 115 is powered up (i.e., woken up), it is desirable for the voltage of the circuit 115 to ramp up as fast as possible while staying within current inrush limits. The power-down latency (i.e., sleep-entry latency) and the power-up latency (i.e., wake-up latency) of the circuit 115 may determine how often software can make use of the inactive mode (also referred to as deep sleep state) to save power. Generally, the shorter the sleep-entry latency and the wake-up latency, the more often software can make use of the deep sleep state to save power.

As discussed above, the power manager 125 may place the circuit 115 in different performance modes (also referred to as performance states), in which the different performance modes may correspond to different supply voltages. The delay elements 220-1 to 220-*n* and 260-1 to 260-*m* are powered by the supply voltage Vdd on the supply rail 122. Since the different performance modes correspond to different supply voltages, the time delays of the delay elements 220-1 to 220-*n* and 260-1 to 260-*m* depend on the current performance mode. The time delays of the delay elements 220-1 to 220-*n* and 260-1 to 260-*m* are shorter for the high-performance mode (which has a high supply voltage) compared with the low-performance mode (which has a low supply voltage).

In the implementation shown in FIG. 2, the sleep-entry latency and the wake-up latency of the power switching circuit 135 may be optimized for one of the performance modes. However, optimizing the sleep-entry latency and the wake-up latency for one of the performance modes causes the sleep-entry latency and the wake-up latency to be suboptimal for the other performance modes. For example, the sleep-entry latency and the wake-up latency may be optimized for the high-performance mode (which has a high supply voltage). However, the sleep-entry latency and the wake-up latency substantially increase for the low-performance mode since the low supply voltage associated with the low-performance mode increases the time delays of the delay elements 220-1 to 220-*n* and 260-1 to 260-*m*. As a result, the sleep-entry latency and the wake-up latency for the low-performance mode may be much longer than needed to manage inrush current.

To address this, aspects of the present disclosure divide the first power chain 215 into a first set of multiple power chains, in which the power switch controller dynamically configures enablement of the multiple power chains in the first set based on a performance mode (i.e., performance state) input. For example, in the high-performance mode, the power switch controller may sequentially enable the power chains in the first set. In the low-performance mode, the power switch controller may enable the power chains in the first set in parallel to reduce the wake-up time (i.e., wake-up latency) in the low-performance mode. In a performance mode between the high-performance mode and the low-performance mode, the power switch controller may offset enablement of the power chains in the first set by a programmable time value, as discussed further below.

In certain aspects, the second power chain 250 is divided into a second set of multiple power chains. In these aspects, the power switch controller 140 may enable the power chains in the second set in parallel (e.g., after all of the power chains in the first set have been enabled).

Figure 3:
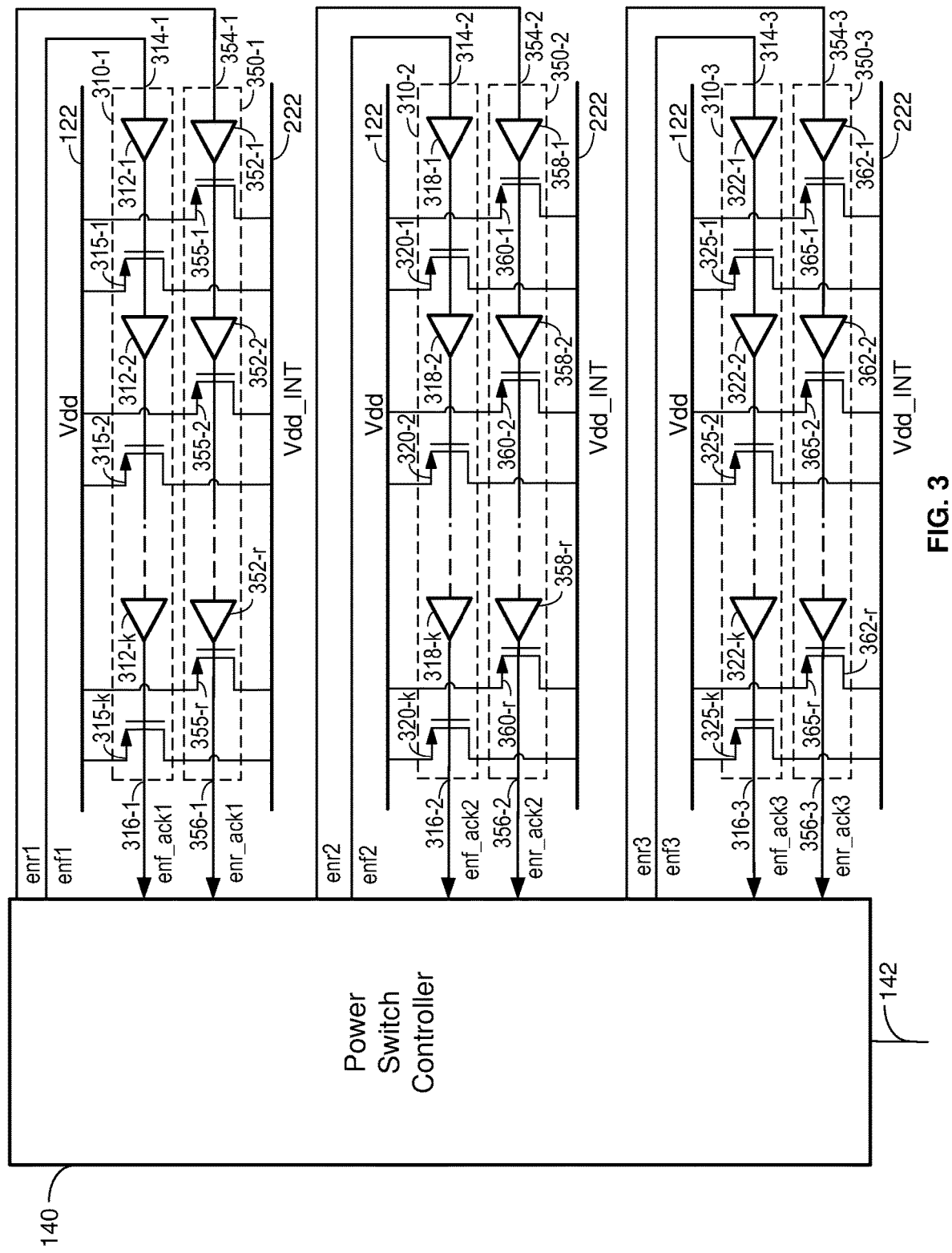
FIG. 3 shows an example of a power switching circuit including multiple power chains according to certain aspects of the present disclosure.

FIG. 3 shows an exemplary implementation of the power switching circuit 135 according to certain aspects of the present disclosure. In this example, the first power chain 215 in FIG. 2 is divided into a first set of multiple power chains 310-1 to 310-3. The power chains 310-1 to 310-3 in the first set of power chains include power switches with high on resistances to manage inrush current during power up, as discussed further below. In the example shown in FIG. 3, the first power chain 215 is divided into three power chains 310-1 to 310-3. However, it is to be appreciated that the present disclosure is not limited to this example, and that the first power chain 215 may be divided into a different number of power chains.

The first power chain 310-1 in the first set includes power switches 315-1 to 315-*k* and delay elements 312-1 to 312-*k*. In the example shown in FIG. 3, each of the power switches 315-1 to 315-*k* is coupled between the voltage supply rail 122 and an internal rail 222 (also referred to as a virtual rail) of the circuit 115. The delay elements 312-1 to 312-*k* are coupled in series to form a delay line, in which a control input of each of the power switches 315-1 to 315-*k* is coupled to a respective position on the delay line. The first power chain 310-1 has an input 314-1 coupled to one end of the delay line and an output 316-1 coupled to the other end of the delay line.

The second power chain 310-2 in the first set includes power switches 320-1 to 320-*k* and delay elements 318-1 to 318-*k*. In the example shown in FIG. 3, each of the power switches 320-1 to 320-*k* is coupled between the voltage supply rail 122 and the internal rail 222 of the circuit 115. The delay elements 318-1 to 318-*k* are coupled in series to form a delay line, in which a control input of each of the power switches 320-1 to 320-*k* is coupled to a respective position on the delay line. The second power chain 310-2 has an input 314-2 coupled to one end of the delay line and an output 316-2 coupled to the other end of the delay line.

The third power chain 310-3 in the first set includes power switches 325-1 to 325-*k* and delay elements 322-1 to 322-*k*. In the example shown in FIG. 3, each of the power switches 325-1 to 325-*k* is coupled between the voltage supply rail 122 and the internal rail 222 of the circuit 115. The delay elements 322-1 to 322-*k* are coupled in series to form a delay line, in which a control input of each of the power switches 325-1 to 325-*k* is coupled to a respective position on the delay line. The third power chain 310-3 has an input 314-3 coupled to one end of the delay line and an output 316-3 coupled to the other end of the delay line.

In the example shown in FIG. 3, the enable signals to the first, second and third power chains 310-1 to 310-3 are labeled "enf1", "enf2" and "enf3", respectively. The acknowledgement signals output by the first, second and third power chains 310-1 to 310-3 are labeled "enf_ack1", "enf_ack2" and "enf_ack3", respectively. As discussed above, a power chain outputs an acknowledgment signal when an enable signal propagates through the length of the power chain. An enablement signal turns on a power switch when the enablement signal reaches the control input of the power switch coupled to the respective delay line. For the example in which a power switch is implemented with a power transistor, the control input corresponds to the gate of the power transistor.

In this example, the second power chain 250 in FIG. 2 is divided into a second set of multiple power chains 350-1 to 350-3. The power chains 350-1 to 350-3 in the second set of power chains include power switches with low on resistances to provide low resistance in the mission mode, as discussed further below. In the example shown in FIG. 3, the second power chain 250 is divided into three power chains 350-1 to 350-3. However, it is to be appreciated that the present disclosure is not limited to this example.

The first power chain 350-1 in the second set includes power switches 355-1 to 355-r and delay elements 352-1 to 352-r. In the example shown in FIG. 3, each of the power switches 355-1 to 355-r is coupled between the voltage supply rail 122 and the internal rail 222 of the circuit 115. The delay elements 352-1 to 352-r are coupled in series to form a delay line, in which a control input of each of the power switches 355-1 to 355-r is coupled to a respective position on the delay line. The first power chain 350-1 has an input 354-1 coupled to one end of the delay line and an output 356-1 coupled to the other end of the delay line.

The second power chain 350-2 in the second set includes power switches 360-1 to 360-r and delay elements 358-1 to 358-r. In the example shown in FIG. 3, each of the power switches 360-1 to 360-r is coupled between the voltage supply rail 122 and the internal rail 222 of the circuit 115. The delay elements 358-1 to 358-r are coupled in series to form a delay line, in which a control input of each of the power switches 360-1 to 360-r is coupled to a respective position on the delay line. The second power chain 350-2 has an input 354-2 coupled to one end of the delay line and an output 356-2 coupled to the other end of the delay line.

The third power chain 350-3 in the second set includes power switches 365-1 to 365-r and delay elements 362-1 to 362-r. In the example shown in FIG. 3, each of the power switches 365-1 to 365-r is coupled between the voltage supply rail 122 and the internal rail 222 of the circuit 115. The delay elements 362-1 to 362-r are coupled in series to form a delay line, in which a control input of each of the power switches 365-1 to 365-r is coupled to a respective position on the delay line. The third power chain 350-3 has an input 354-3 coupled to one end of the delay line and an output 356-3 coupled to the other end of the delay line.

In the example shown in FIG. 3, the enable signals to the first, second and third power chains 350-1 to 350-3 are labeled "enr1", "enr2" and "enr3", respectively. The acknowledgement signals output by the first, second and third power chains 350-1 to 350-3 are labeled "enr_ack1", "enr_ack2" and "enr_ack3", respectively.

In this example, the power switch controller 140 may power up the circuit 115 in one of multiple configuration modes depending on the performance mode of the circuit 115. The configuration modes may include a cascade mode, a timer mode, and a concurrent mode. As discussed further below, the power switch controller 140 may select one of these configuration modes based on the performance mode of the circuit 115. Each of these configuration modes is discussed further below according to aspects of the present disclosure.

In the cascade mode, the power switch controller 140 enables the power chains 310-1 to 310-3 in the first set of power chains sequentially. More particularly, the power switch controller 140 outputs the enable signal enf1 to the input 314-1 of the first power chain 310-1 to initiate sequential turn on of the power switches 315-1 to 315-k in the first power chain 310-1. The power switch controller 140 waits for the acknowledgement signal enf_ack1 from the output 316-1 of the first power chain 310-1 before enabling the second power chain 310-2. In response to receiving the acknowledgement signal enf_ack1 from the first power chain 310-1, the power switch controller 140 outputs the enable signal enf2 to the input 314-2 of the second power chain 310-2 to initiate sequential turn on of the power switches 320-1 to 320-k in the second power chain 310-2. The power switch controller 140 waits for the acknowledgement signal enf_ack2 from the output 316-2 of the second power chain 310-2 before enabling the third power chain 310-3. In response to receiving the acknowledgement signal enf_ack2 from the second power chain 310-2, the power switch controller 140 outputs the enable signal enf3 to the input 314-3 of the third power chain 310-3 to initiate sequential turn on of the power switches 325-1 to 325-k in the third power chain 310-3. The power up sequence for the power chains 310-1 to 310-3 in the first set of power chains may be expressed as follows: enf1→enf1_ack→enf2→enf_ack2→enf3→enf_ack3.

In the cascade mode, the power switch controller 140 may enable the power chains 350-1 to 350-3 in the second set in parallel (e.g., after receiving the acknowledgement enf_ack3 from the third power chain 310-3 or another event). The power switch controller 140 enables the power chains 350-1 to 350-3 in parallel by concurrently outputting the enable signals enr1, enr2 and enr3 to the inputs of the first, second and third power chains 350-1 to 350-3, respectively.

The cascade mode may be useful for the high-performance mode where the voltage difference between the supply rail 122 and the internal rail 222 is high at the start of power up.

In the timer mode, the power switch controller 140 offsets enablement of the power chains 310-1 to 310-3 in the first set of power chains by a programmable time value. More particularly, the power switch controller 140 outputs the enable signal enf1 to the input 314-1 of the first power chain 310-1 to initiate sequential turn on of the power switches 315-1 to 315-k in the first power chain 310-1. The power switch controller 140 may also start a timer when enable signal enf1 is output. When the timer reaches the time value (i.e., the timer times out), the power switch controller 140 outputs the enable signal enf2 to the input 314-2 of the second power chain 310-2 to initiate sequential turn on of the power switches 320-1 to 320-k in the second power chain 310-2. The power switch controller 140 may also reset and restart the timer when enable signal enf2 is output. When the timer reaches the time value (i.e., the timer times out), the power switch controller 140 outputs the enable signal enf3 to the input 314-3 of the third power chain 310-3 to initiate sequential turn on of the power switches 325-1 to 325-k in the third power chain 310-3. Thus, the power switch controller 140 offsets enablement of the power chains 310-1 to 310-3 in time by the programmable time value. The power up sequence for the power chains 310-1 to 310-3 in the first set of power chains may be expressed as follows: enf1→Time Out→enf2→Time Out→enf3→Time Out, where "Time Out" is a time out of the timer.

In the timer mode, the power switch controller 140 may enable the power chains 350-1 to 350-3 in the second set in parallel (e.g., after receiving the acknowledgement enf_ack3 from the third power chain 310-3 or another event). The power switch controller 140 enables the power chains 350-1 to 350-3 in parallel by concurrently outputting the enable signals enr1, enr2 and enr3 to the inputs of the first, second and third power chains 350-1 to 350-3, respectively.

The timer mode may be useful for an intermediate-performance mode (i.e., a performance mode between the high-performance mode and the low-performance mode) where the voltage difference between the supply rail 122 and the internal rail 222 is moderate at the start of power up. In one example, the time value may be programmed based on the voltage difference between the supply rail 122 and the internal rail 222 at the start of power up. In this example, a larger time value may be programmed for a larger voltage difference (i.e., voltage delta) and a smaller time value may be programmed for a smaller voltage difference. In one example, a time value may be determined for a performance mode (e.g., the "Nominal" mode discussed above) by running PDN simulations or performing PDN tests to determine inrush currents and/or voltage droops for different time values. In this example, the smallest time value that complies with inrush current limits and/or voltage droop limits may be used for the performance mode. This helps provide the lowest possible latency while complying with inrush current limits and/or voltage droop limits.

In the concurrent mode, the power switch controller 140 enables the power chains 310-1 to 310-3 in the first set of power chains in parallel. The power switch controller 140 enables the power chains 310-1 to 310-3 in parallel by concurrently outputting the enable signals enf1, enf2 and enf3 to the inputs of the first, second and third power chains 310-1 to 310-3, respectively, in the first set of power chains. In this mode, the power switch controller 140 may also enable the power chains 350-1 to 350-3 in the second set in parallel (e.g., after receiving all of the acknowledgements from the power chain 310-1 to 310-3 in the first set or another event). The power switch controller 140 enables the power chains 350-1 to 350-3 in parallel by concurrently outputting the enable signals enr1, enr2 and enr3 to the inputs of the first, second and third power chains 350-1 to 350-3, respectively, in the second set of power chains.

The concurrent mode may be useful for the low-performance mode where the voltage difference between the supply rail 122 and the internal rail 222 is low.

In certain aspects, the power switch controller 140 receives a select signal. In these aspects, the power switch controller 140 selects one of the configuration modes (e.g., the cascade mode, the timer mode and the concurrent mode) based on the select signal, and powers up the circuit 115 using the selected configuration mode. In one example, the select signal has one of multiple select values, in which each of the select values corresponds (i.e., maps) to one of the configuration modes. In this example, the power switch controller 140 receives the select signal, and selects the configuration mode corresponding to the select value of the select signal. In certain aspects, each of the select values also corresponds (i.e., maps) to a particular performance mode (i.e., performance state) for the circuit 115. In these aspects, the performance modes and the configuration modes may be mapped to the select values such that, for each performance mode, the power switch controller 140 selects the desired configuration mode for the performance mode (e.g., selects the cascade mode for the high-performance mode, the concurrent mode for the low-performance mode, etc.).

Exemplary operations of the power switch controller 140 will now be described according to aspects of the present disclosure. In one example, the performance modes include a high-performance mode (also referred to as "Turbo" mode), a first intermediate-performance mode (also referred to as "Nominal" mode), a second intermediate-performance mode (also referred to as "SVS" mode), and a low-performance mode (also referred to a "Low SVS" mode). In this example, the high-performance mode maps to the cascade mode, the first intermediate performance mode maps to a first timer mode, the second intermediate-performance mode maps to a second timer mode, and the low-performance mode maps to the concurrent mode. The first timer mode and the second timer mode both correspond to the timer mode discussed above, but have different time values. For example, the second timer mode may have a shorter time value than the first timer mode, and the second intermediate-performance mode may have a lower supply voltage than the first intermediate-performance mode. Of the four performance modes, the high-performance mode has the highest supply voltage, the low-performance mode has the lowest supply voltage, and the supply voltages of the first and second intermediate-performance modes are between the supply voltages of the high-performance mode and the low-performance mode. In certain aspects, the high-performance mode has the highest clock frequency, the low-performance mode has the lowest clock frequency, and the clock frequencies of the first and second intermediate-performance modes are between the clock frequencies of the high-performance mode and the low-performance mode.

In one example, the select signal may have a select value from 0 to 3, in which each select value maps to one of the performance modes and one of the configuration modes according to Table 1 below.

TABLE 1

| Select Value | Performance Mode | Configuration Mode |
|---|---|---|
| 0 | High-Performance Mode | Cascade Mode |
| 1 | First Intermediate-Performance Mode | First Timer Mode |
| 2 | Second Intermediate-Performance Mode | Second Timer Mode |
| 3 | Low-Performance Mode | Concurrent Mode |

The power manager 125 may generate the select signal based on the performance mode for the circuit 115, and input the select signal to the power switch controller 140. The power manager 125 sets the select value of the select signal according to the performance mode for the circuit. In the above example, the power manager 125 sets the select value to 0 if the circuit 115 is to be placed in the high-performance mode, 1 if the circuit 115 is to be placed in the first intermediate-performance mode, 2 if the circuit 115 is to be placed in the second intermediate-performance mode, and 3 if the circuit 115 is to be placed in the low-performance mode. The above operations may also be performed by the PMIC 120 since the PMIC 120 is aware of the performance mode. This is because the PMIC 120 sets the voltage level of the supply voltage Vdd according to the performance mode.

The power switch controller 140 receives the select signal, selects the configuration mode corresponding to the value of the select signal, and powers up the circuit 115 using the selected configuration mode in response to a power-up command from the power manager 125. In the above example, the power switch controller 140 selects the cascade mode if the select value is 0, selects the first timer mode if the select value is 1, selects the second timer mode if the select value is 2, and selects the concurrent mode if the select value is 3.

Figure 4:
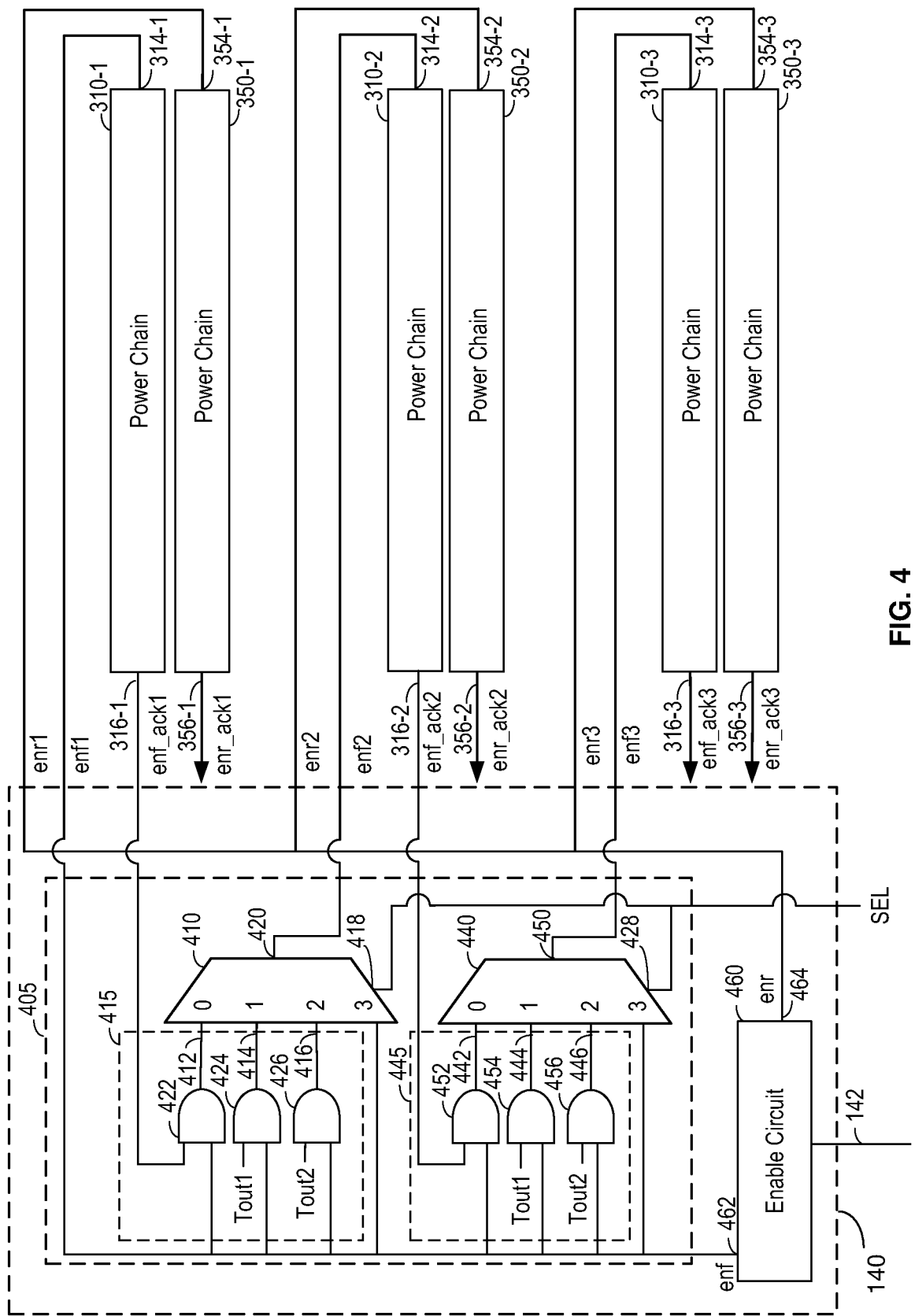
FIG. 4 shows an exemplary implementation of a power switch controller according to certain aspects of the present disclosure.

FIG. 4 shows an exemplary implementation of the power switch controller 140 according to certain aspects of the present disclosure. For ease of illustration, the details of the power chains 310-1 to 310-3 and 350-1 to 350-3 shown in FIG. 3 are not shown in FIG. 4.

In this example, the power switch controller 140 includes a control circuit 405 and an enable circuit 460. The enable circuit 460 is configured to generate an input enable signal (labeled "enf") for the first set of power chains 310-1 to 310-3 and an input enable signal (labeled "enr") for the second set of power chains 350-1 to 350-3. For example, the enable circuit 460 may generate and output the input enable signal enf for the first set of power chains 310-1 to 310-3 in response to a power-up command from the power manager 125. The enable circuit 460 may generate and output the input enable signal enr for the second set of power chains 350-1 to 350-3 after the power switch controller 140 receives an acknowledgement from all of the power chains 310-1 to 310-3 in the first set.

The control circuit 405 receives the input enable signal enf, the select signal (labeled "SEL"), the acknowledgement signal enf_ack1 from the first power chain 310-1 in the first set, and the acknowledgement signal enf_ack2 from the second power chain 310-2 in the first set. The control circuit 405 outputs the enable signals enf1, enf2 and enf3 for the first, second and third power chains 310-1 to 310-3 in the first set of power chains. The control circuit 405 is configured to output the enable signals enf1, enf2 and enf3 in the cascade mode, the first timer mode, the second timer mode or the concurrent mode based on the select value of the select signal SEL, as discussed further below.

An exemplary implementation of the control circuit 405 will now be discussed with reference to FIG. 4 according to aspects of the present disclosure. In the discussion below, an enable signal is assumed to have a logic value (i.e., logic state) of one and an acknowledgment signal is assumed to have a logic value of one. However, those skilled in the art will appreciate that this need not be the case. For the example in which a power switch is implemented with a PMOS power transistor, a power chain may include one or more internal inverters for inverting the logic one of an enable signal to a logic zero to turn on the PMOS power transistor.

In the example shown in FIG. 4, the control circuit 405 outputs the input enable signal enf from the enable circuit 460 to the input 314-1 of the first power chain 310-1 as enable signal enf1. The timing of the enable signal enf1 may be the same for all the configuration modes. In the example shown in FIG. 4, the output 462 of the enable circuit 460 that outputs the enable signal enf is coupled to the input 314-1 of the first power chain 310-1.

The control circuit 405 includes a first multiplexer 410 and a first logic circuit 415 for generating the enable signal enf2 for the second power chain 310-2. The first logic circuit 415 is coupled to the output 462 of the enable circuit 460, and the output 316-1 of the first power chain 310-1. The first logic circuit 415 has a first output 412, a second output 414, and a third output 416. The first logic circuit 415 is configured to output an enable signal at the first output 412 when an acknowledgement signal enf_ack1 is received from the first power chain 310-1, output an enable signal at the second output 414 that is offset from the input enable signal enf by the first time value, and output an enable signal at the third output 416 that is offset from the input enable signal enf by the second time value.

The first multiplexer 410 has a first input (labeled "0") coupled to the first output 412 of the first logic circuit 415, a second input (labeled "1") coupled to the second output 414 of the first logic circuit 415, a third input (labeled "2") coupled to the third output 416 of the first logic circuit 415, and a fourth input (labeled "3") coupled to the output 462 of the enable circuit 460. The first multiplexer 410 also has a select input 418 coupled to the select signal SEL, and an output 420 that provides the enable signal enf2 for the second power chain 310-2 and is coupled to the input 314-2 of the second power chain 310-2.

The first multiplexer 410 is configured to select one of the inputs of the first multiplexer 410 based on the value of the select signal SEL, and couple the selected one of the inputs to the output 420. In the example in FIG. 4, the first multiplexer 410 couples the first output 412 of the first logic circuit 415 to the output 420 when the select signal SEL is 0, couples the second output 414 of the first logic circuit 415 to the output 420 when the select signal SEL is 1, couples the third output 416 of the first logic circuit 415 to the output 420 when the select signal SEL is 2, and couples the output 462 of the enable circuit 460 to the output 420 when the select signal SEL is 3.

Thus, when the select signal SEL is 0, the first multiplexer 410 outputs the enable signal enf2 to the input 314-2 of the second power chain 310-2 when the acknowledgement enf_ack1 from the first power chain 310-1 is received. When the select signal SEL is 1, the first multiplexer 410 outputs the enable signal enf2 after an elapsed time from the enable signal enf1, in which the elapsed time is equal to the first time value. When the select signal SEL is 2, the first multiplexer 410 outputs the enable signal enf2 after an elapsed time from the enable signal enf1, in which the elapsed time is equal to the second time value. When the select signal SEL is 3, the first multiplexer 410 outputs the enable signal enf2 concurrently with enable signal enf1.

It is to be appreciated that the select signal is not limited to the exemplary select values given above. In general, the first multiplexer 410 selects the first input when the select signal SEL has a first value (e.g., 0), selects the second input when the select signal SEL has a second value (e.g., 1), selects the third input when the select signal SEL has a third value (e.g., 2), and selects the fourth input when the select signal SEL has a fourth value (e.g., 3).

In the example in FIG. 4, the first logic circuit 415 includes a first AND gate 422, a second AND gate 424, and third AND gate 426. The first AND gate 422 has a first input coupled to the output 462 of the enable circuit 460, a second input coupled to the output 316-1 of the first power chain 310-1, and an output coupled to the first output 412 of the first logic circuit 415. The first AND gate 422 outputs an enable signal having a logic value of one when both the input enable signal enf and the acknowledgment signal enf_ack1 are one. When the first AND gate 422 receives the enable signal enf, the first AND gate 422 couples the output 316-1 of the first power chain 310-1 to the first input of the first multiplexer 410. Thus, the first AND gate 422 outputs the enable signal when the first power chain 310-1 outputs the acknowledgment signal enf_ack1.

The second AND gate 424 has a first input coupled to the output 462 of the enable circuit 460, a second input coupled to a timer 510 (shown in FIG. 5), and an output coupled to the second output 414 of the first logic circuit 415. The timer 510 is configured to output a first time-out signal (labeled "Tout1") having a logic value of one to the second AND gate 424 after an elapsed time from the input enable signal enf equal to the first time value. Thus, the second AND gate 424 outputs the enable signal after an elapsed time from the input enable signal enf equal to the first time value. An exemplary implementation of the timer 510 is discussed below with reference to FIG. 5.

The third AND gate 426 has a first input coupled to the output 462 of the enable circuit 460, a second input coupled to the timer 510, and an output coupled to the third output 416 of the first logic circuit 415. The timer 510 is configured to output a second time-out signal (labeled "Tout2") having a logic value of one to the third AND gate 426 after an elapsed time from the input enable signal enf equal to the second time value. Thus, the third AND gate 426 outputs the enable signal after an elapsed time from the input enable signal enf equal to the second time value. Note that, for ease of illustration, the individual connections between the timer 510 and the second and third AND gates 424 and 426 are not explicitly shown in FIG. 4.

The control circuit 405 also includes a second multiplexer 440 and a second logic circuit 445 for generating the enable signal enf3 for the third power chain 310-3. The second logic circuit 445 is coupled to the output 462 of the enable circuit 460, and the output 316-2 of the second power chain 310-2. The second logic circuit 445 has a first output 442, a second output 444, and a third output 446. The second logic circuit 445 is configured to output an enable signal at the first output 442 when an acknowledgement signal enf_ack2 is received from the second power chain 310-2, output an enable signal at the second output 444 that is offset from the enable signal enf2 by the first time value, and output an enable signal at the third output 446 that is offset from the enable signal enf2 by the second time value.

The second multiplexer 440 has a first input (labeled "0") coupled to the first output 442 of the second logic circuit 445, a second input (labeled "1") coupled to the second output 444 of the second logic circuit 445, a third input (labeled "2") coupled to the third output 446 of the second logic circuit 445, and a fourth input (labeled "3") coupled to the output 462 of the enable circuit 460. The second multiplexer 440 also has a select input 428 coupled to the select signal SEL, and an output 450 that provides the enable signal enf3 for the third power chain 310-3 and is coupled to the input 314-3 of the third power chain 310-3.

The second multiplexer 440 is configured to select one of the inputs of the second multiplexer 440 based on the value of the select signal SEL, and couple the selected one of the inputs to the output 450. In the example in FIG. 4, the second multiplexer 440 couples the first output 442 of the second logic circuit 445 to the output 450 when the select signal SEL is 0, couples the second output 444 of the second logic circuit 445 to the output 450 when the select signal SEL is 1, couples the third output 446 of the second logic circuit 445 to the output 450 when the select signal SEL is 2, and couples the output 462 of the enable circuit 460 to the output 450 when the select signal SEL is 3.

Thus, when the select signal SEL is 0, the second multiplexer 440 outputs the enable signal enf3 to the input 314-3 of the third power chain 310-3 when the acknowledgement enf_ack2 from the second power chain 310-2 is received. When the select signal SEL is 1, the second multiplexer 440 outputs the enable signal enf3 after an elapsed time from the enable signal enf2, in which the elapsed time is equal to the first time value. When the select signal SEL is 2, the second multiplexer 440 outputs the enable signal enf3 after an elapsed time from the enable signal enf2, in which the elapsed time is equal to the second time value. When the select signal SEL is 3, the second multiplexer 440 outputs the enable signal enf3 concurrently with enable signal enf1.

It is to be appreciated that the select signal SEL is not limited to the exemplary select values given above. In general, the second multiplexer 440 selects the first input when the select signal SEL has a first value (e.g., 0), selects the second input when the select signal SEL has a second value (e.g., 1), selects the third input when the select signal SEL has a third value (e.g., 2), and selects the fourth input when the select signal SEL has a fourth value (e.g., 3).

In the example in FIG. 4, the second logic circuit 445 includes a first AND gate 452, a second AND gate 454, and third AND gate 456. The first AND gate 452 has a first input coupled to the output 462 of the enable circuit 460, a second input coupled to the output 316-2 of the second power chain 310-2, and an output coupled to the first output 442 of the second logic circuit 445. The first AND gate 452 outputs an enable signal having a logic value of one when both the input enable signal enf and the acknowledgment signal enf_ack2 are one. When the first AND gate 452 receives the enable signal enf, the first AND gate 452 couples the output 316-2 of the second power chain 310-2 to the first input of the second multiplexer 440. Thus, the first AND gate 452 outputs the enable signal when the second power chain 310-2 outputs the acknowledgment signal enf_ack2.

The second AND gate 454 has a first input coupled to the output 462 of the enable circuit 460, a second input coupled to the timer 510, and an output coupled to the second output 444 of the second logic circuit 445. The timer 510 is configured to output a first time-out signal (labeled "Tout1") having a logic value of one to the second AND gate 454 after an elapsed time from the enable signal enf2 equal to the first time value. Thus, the second AND gate 454 outputs the enable signal after an elapsed time from the enable signal enf2 equal to the first time value.

The third AND gate 456 has a first input coupled to the output 462 of the enable circuit 460, a second input coupled to the timer 510, and an output coupled to the third output 446 of the second logic circuit 445. The timer 510 is configured to output a second time-out signal (labeled "Tout2") having a logic value of one to the third AND gate 456 after an elapsed time from the enable signal enf2 equal to the second time value. Thus, the third AND gate 456 outputs the enable signal after an elapsed time from the enable signal enf2 equal to the second time value. Note that, for ease of illustration, the individual connections between the timer 510 and the second and third AND gates 454 and 456 are not explicitly shown in FIG. 4.

In the example shown in FIG. 4, the power switch controller 140 outputs the input enable signal enr concurrently to the inputs of the first, second and third power chains 350-1 to 350-3 in the second set of power chains. Thus, the power switch controller 140 enables the first, second and third power chains 350-1 to 350-3 in the second set in parallel. The enable signal enr is output at output 464 of the enable circuit 460. In the example shown in FIG. 4, the output 464 of the enable circuit 460 is coupled to the inputs 354-1 to 354-3 of the power chains 350-1 to 350-3 in the second set of power chains.

Figure 5:
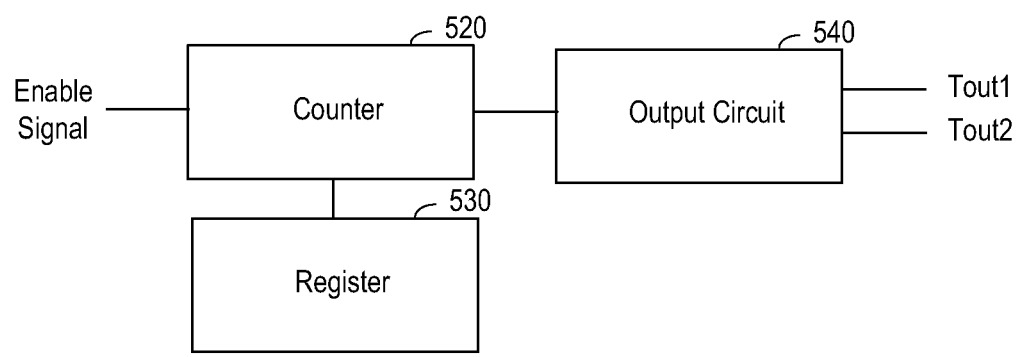
FIG. 5 shows an example of a timer according to certain aspects of the present disclosure.

FIG. 5 shows an example of the timer 510 according to certain aspects. The timer 510 includes one or more counters 520, a register 530 and an output circuit 540 (coupled to the first and second logic circuits 415 and 445 shown in FIG. 4). The counter 520 is configured to count up or count down, and the register 530 stores the first time value and the second time value. The first and second time values may be programmed by writing the first and second time values into the register 530. In one example, the counter 520 is triggered to start counting up by one of the enable signals (e.g., enf or enf2) and times out when the count in the counter 520 reaches the first time value. When this occurs, the output circuit 540 outputs the first time-out signal Tout1. Alternatively, the counter 520 may start counting down from the first time value, and time out when the counter 520 reaches zero. Thus, the elapsed time between the enable signal and the first time-out signal Tout1 is set by the first time value in the register 530. In another example, the counter 520 is triggered to start counting up by one of the enable signals (e.g., enf or enf2) and times out when the count in the counter 520 reaches the second time value. When this occurs, the output circuit 540 outputs the second time-out signal Tout2. Alternatively, the counter 520 may start counting down from the second time value, and time out when the counter 520 reaches zero. Thus, the elapsed time between the enable signal and the second time-out signal Tout2 is set by the second time value in the register 530.

It is to be appreciated that the multiplexers 410 and 440 and the enable circuit 460 may be coupled to the power chains via one or more registers (not shown), drivers (not shown), etc. Thus, it is to be appreciated that the present disclosure does not require direct coupling.

Figure 6:
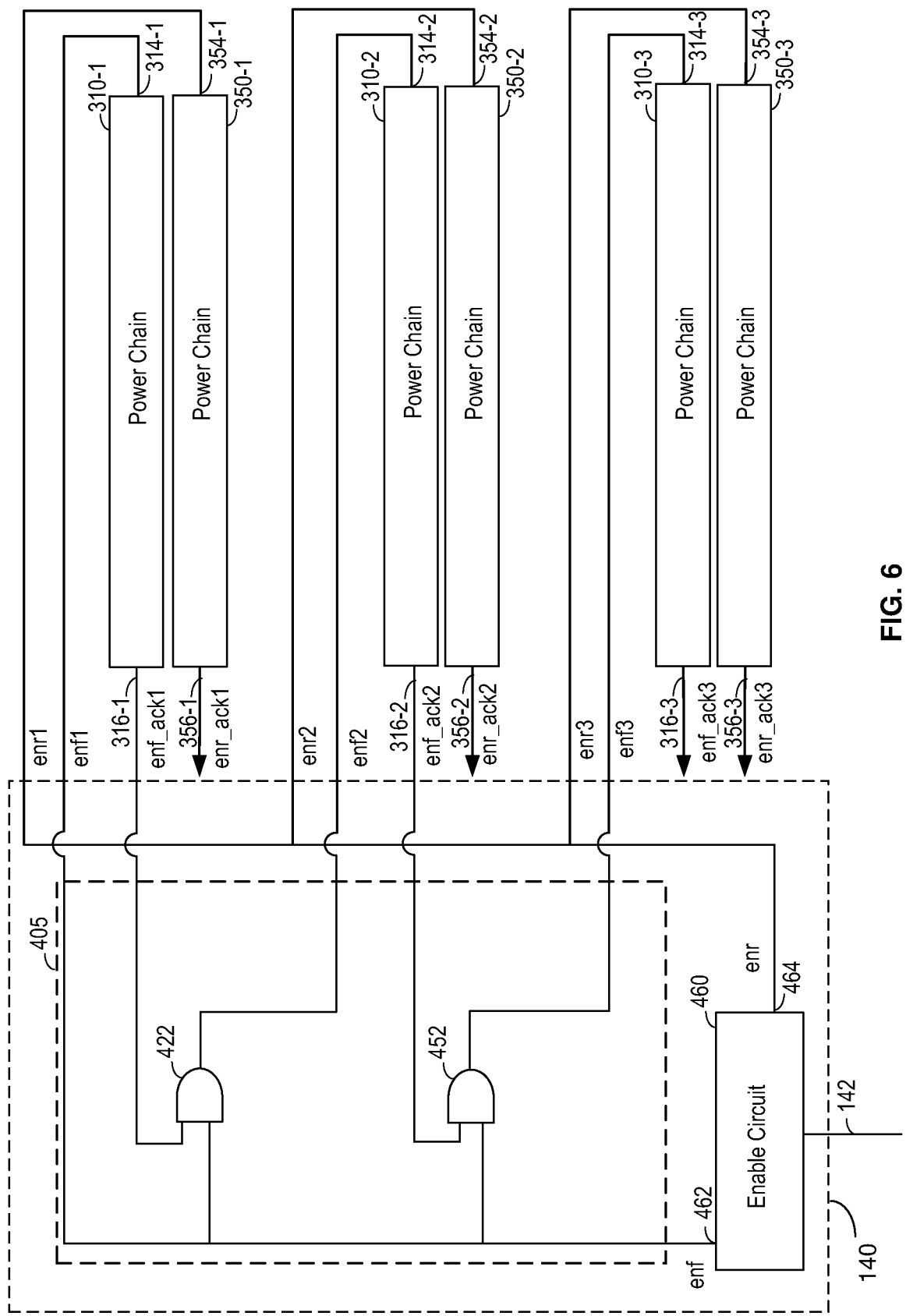
FIG. 6 shows an example of the power switch controller in a first configuration mode according to certain aspects of the present disclosure.

FIG. 6 shows routing for the control circuit 405 when the cascade mode is selected (e.g., the select signal SEL is 0). In this example, the control circuit 405 enables the power chains 310-1 to 310-3 in the first set of power chains sequentially.

Figure 7:
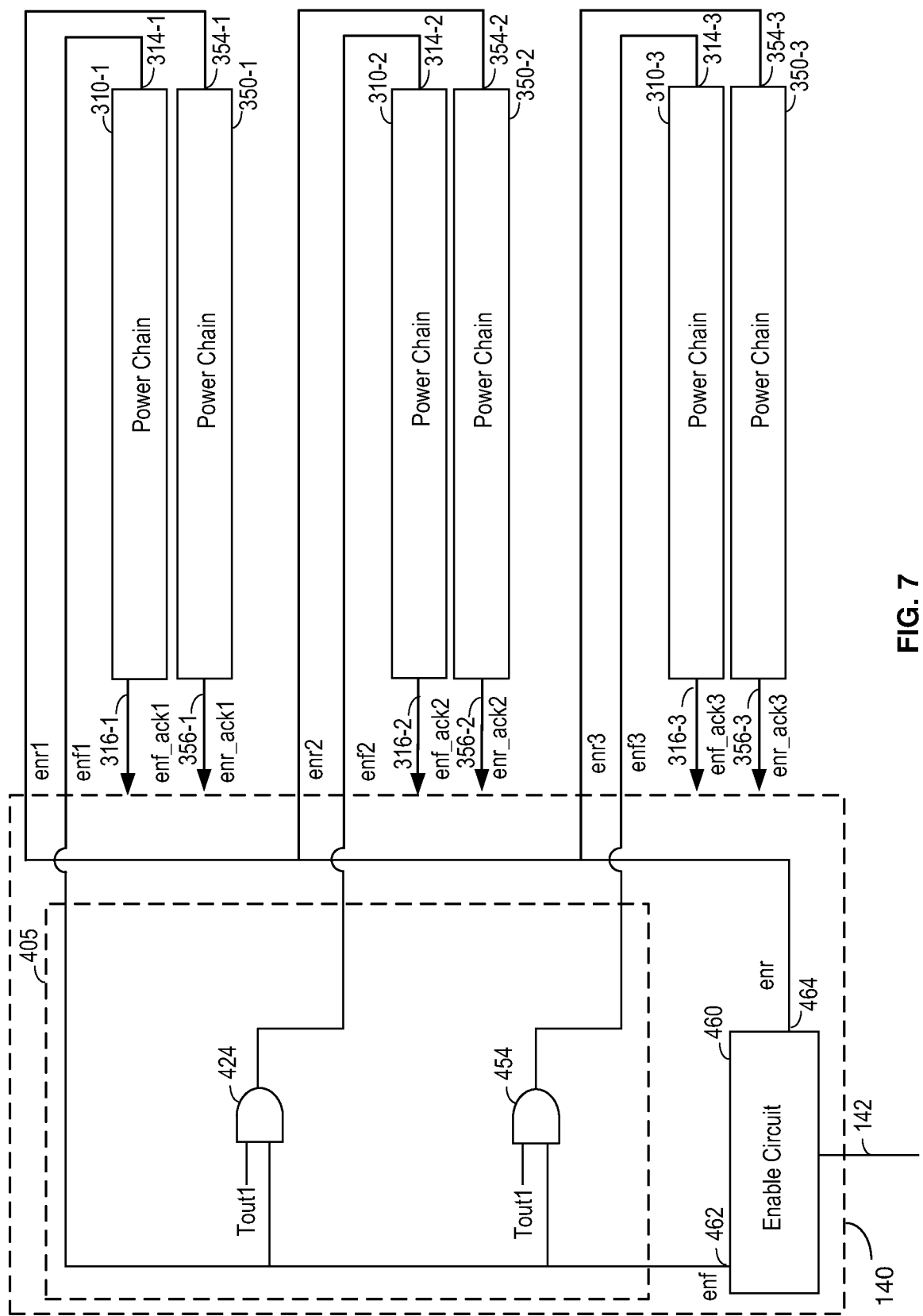
FIG. 7 shows an example of the power switch controller in a second configuration mode according to certain aspects of the present disclosure.

FIG. 7 shows routing for the control circuit 405 when the first timer mode is selected (e.g., the select signal SEL is 1). In this example, the control circuit 405 offsets enablement of the power chains 310-1 to 310-3 in the first set of power chains by the first time value.

Figure 8:
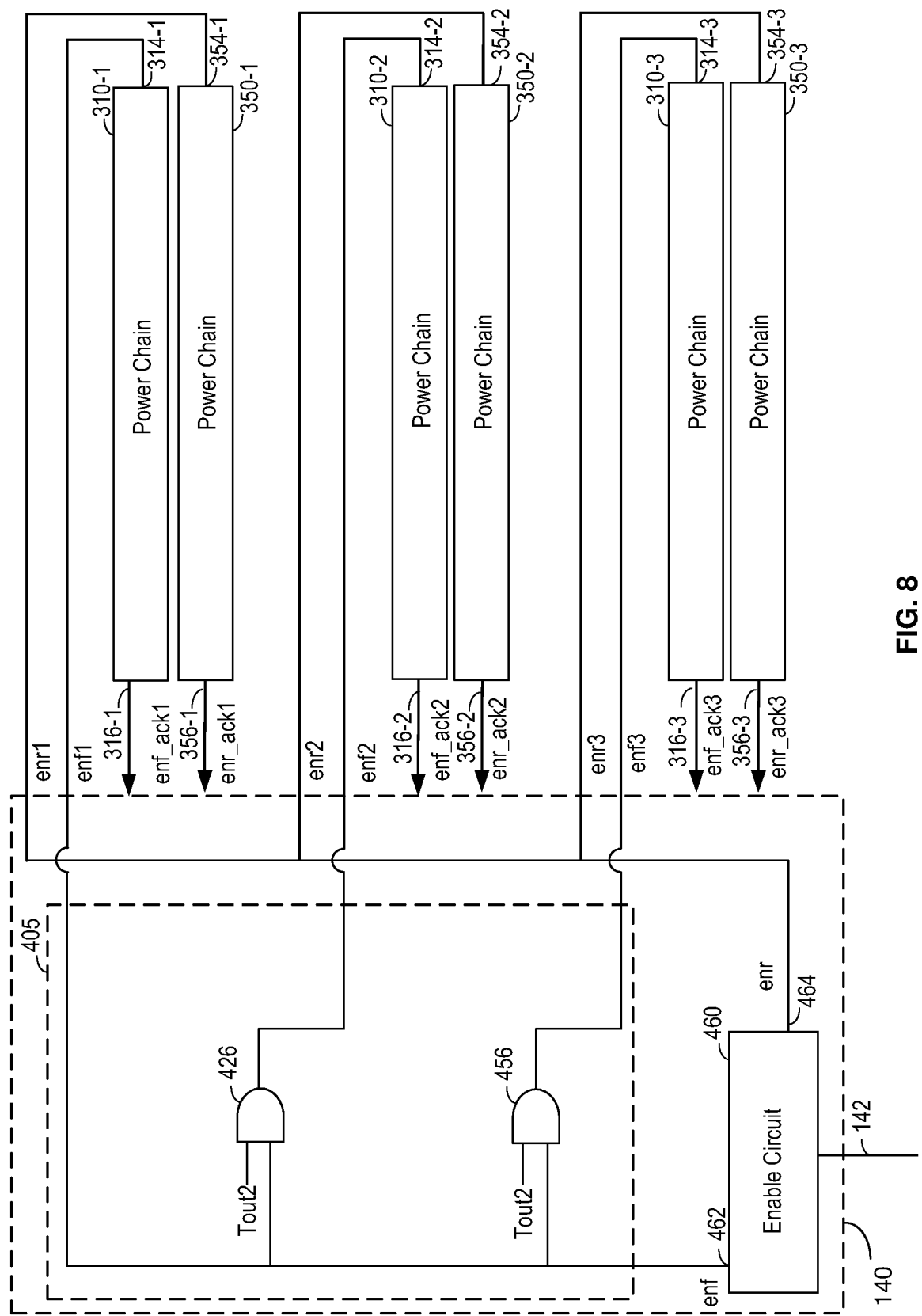
FIG. 8 shows an example of the power switch controller in a third configuration mode according to certain aspects of the present disclosure.

FIG. 8 shows routing for the control circuit 405 when the second timer mode is selected (e.g., the select signal SEL is 2). In this example, the control circuit 405 offsets enablement of the power chains 310-1 to 310-3 in the first set of power chains by the second time value.

Figure 9:
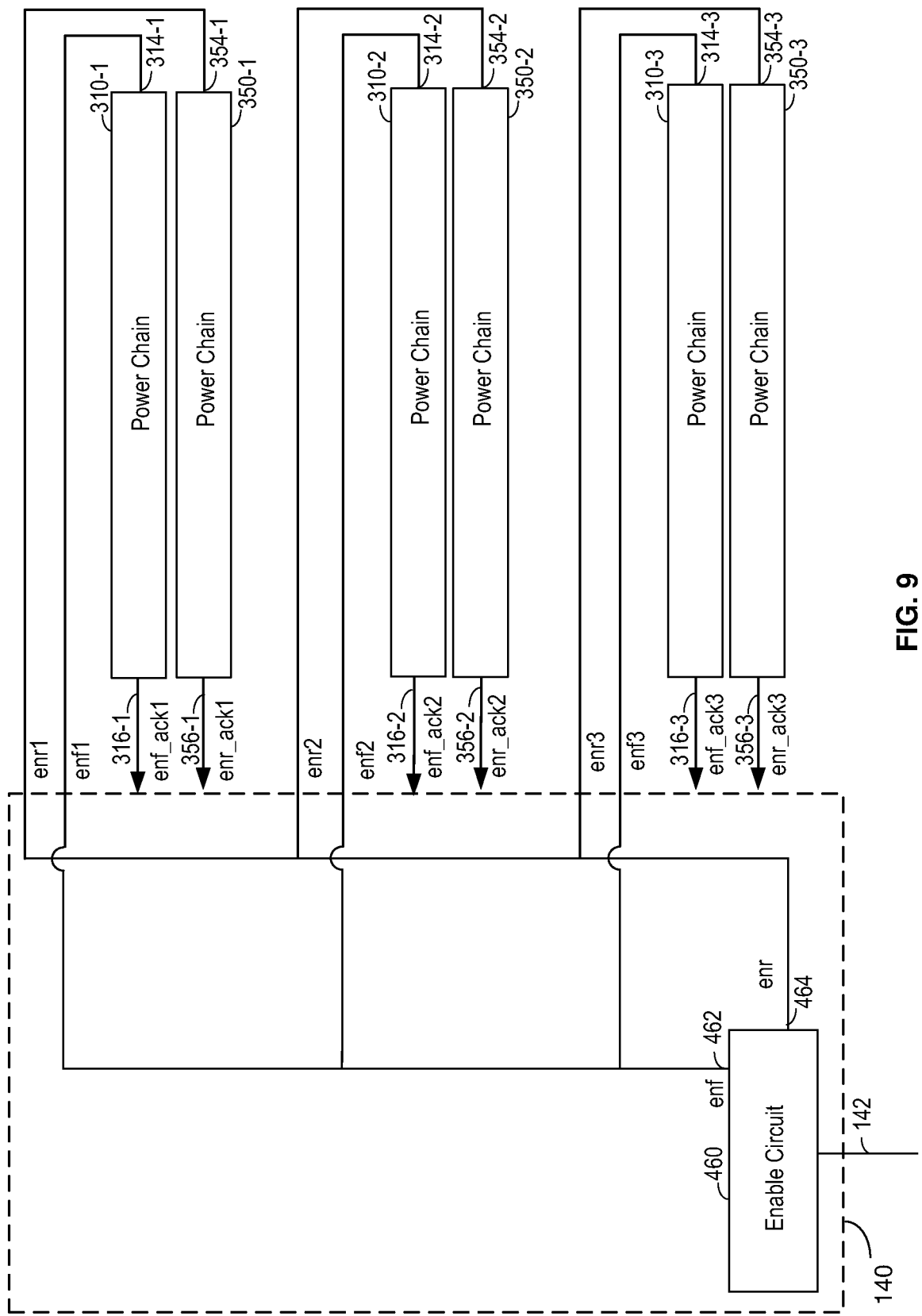
FIG. 9 shows an example of the power switch controller in a fourth configuration mode according to certain aspects of the present disclosure.

FIG. 9 shows routing for the control circuit 405 when the concurrent mode is selected (e.g., the select signal SEL is 3). In this example, the power switch controller 140 concurrently outputs the enable signal enf to the inputs 314-1 to 314-3 of the power chains 310-1 to 310-3 in the first set of power chains to enable the power chains 310-1 to 310-3 in parallel.

Figure 10:
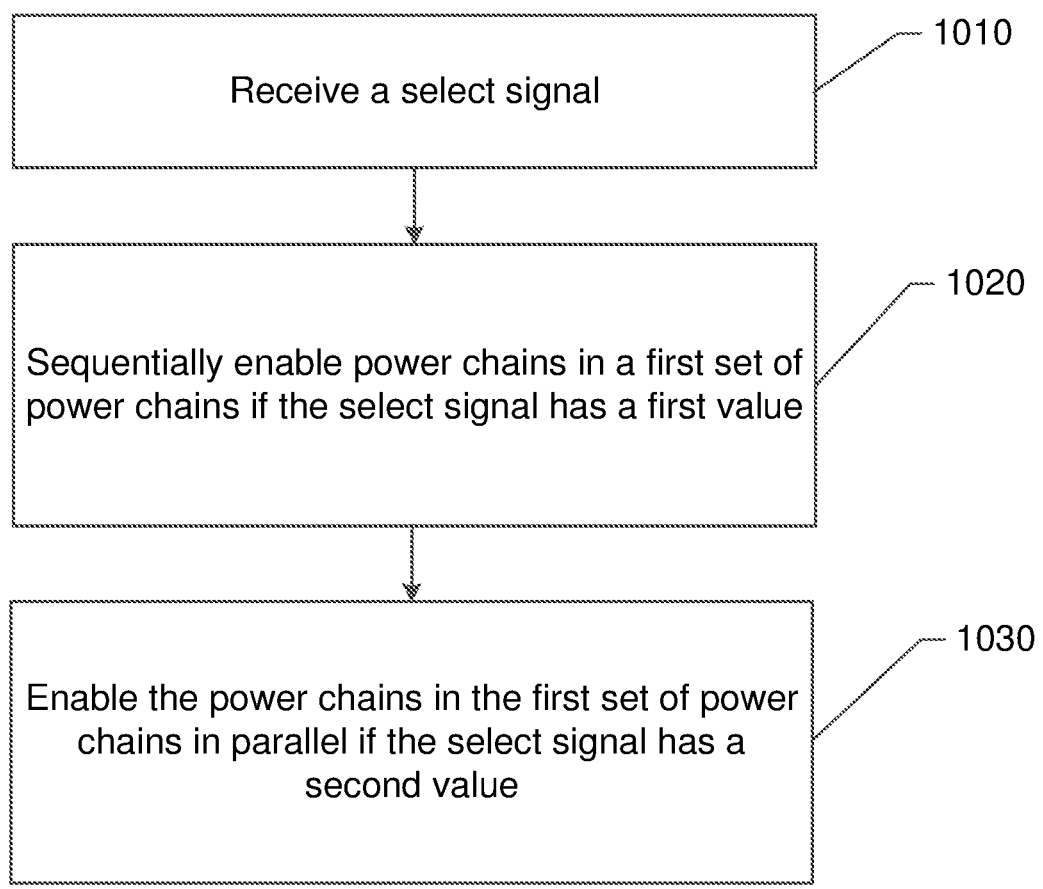
FIG. 10 is a flowchart illustrating an example of a method for power switch control according to certain aspects of the present disclosure.

FIG. 10 is a flowchart illustrating a method 1000 for power switch control according to certain aspects of the present disclosure.

At block 1010, a select signal is received. For example, the select signal may correspond to select signal SEL.

At block 1020, power chains in a first set of power chains are sequentially enabled if the select signal has a first value. For example, the first set of power chains may correspond to power chains 310-1 to 310-3, and the first value may correspond to a high-performance mode.

At block 1030, the power chains in the first set of power chains are enabled in parallel if the select signal has a second value. For example, the power chains (e.g., power chains 310-1 to 310-3) may be enabled in parallel by concurrently outputting enable signals (e.g., enf1, enf2 and enf3) to the power chains. Also, the second value may correspond to a low-performance having a lower supply voltage than the high-performance mode.

It is to be appreciated that the present disclosure is not limited to the exemplary terms used above to describe aspects of the present disclosure. For example, it is to be appreciated that the inactive mode may also be referred to as a sleep mode, an idle mode or another term.

The power manager 125, the PMIC 120 and the power switch controller 140 discussed above may be implemented with a general-purpose processor, a digital signal processor (DSP), an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
   a first power chain having
      a delay line comprising a plurality of delay elements coupled in series, and
      a first plurality of power switches, wherein each of the first plurality of power switches is coupled between a voltage supply rail and a circuit, and a control input of each of the first plurality of power switches is coupled to a respective position on the delay line;
   a second power chain having a second plurality of power switches, wherein on resistances of the first plurality of power switches are higher than on resistances of the second plurality of power switches;
   an enable circuit having an output coupled to an input of the first power chain; and
   a multiplexer having a first input coupled to an output of the first power chain, a second input coupled to the output of the enable circuit, and an output coupled to an input of the second power chain, wherein the multiplexer is configured to receive a select signal, and couple the first input or the second input to the output of the multiplexer based on the select signal.

2. The apparatus of claim 1, wherein the input of the first power chain is coupled to a first end of the first delay line and the output of the first power chain is coupled to a second end of the first delay line.

3. The apparatus of claim 1, wherein each of the first plurality of power switches comprises a power transistor.

4. The apparatus of claim 1, wherein the multiplexer is configured to couple the first input to the output of the multiplexer if the select signal has a first value, and couple the second input to the output of the multiplexer if the select signal has a second value.

5. The apparatus of claim 1, further comprising:
   a timer configured to generate a time-out signal after an elapsed time from an enable signal at the output of the enable circuit, and to output the time-out signal at an output of the timer;

wherein the multiplexer has a third input coupled to the output of the timer, and the multiplexer is configured to couple the first input, the second input or the third input to the output of the multiplexer based on the select signal.

6. The apparatus of claim 5, wherein the multiplexer is configured to couple the first input to the output of the multiplexer if the select signal has a first value, couple the second input to the output of the multiplexer if the select signal has a second value, and couple the third input to the output of the multiplexer if the select signal has a third value.

7. The apparatus of claim 5, wherein the elapsed time is set by a programmable time value in a register.

\* \* \* \* \*